United States Patent [19]

Williams et al.

[11] Patent Number: 4,901,332

[45] Date of Patent: Feb. 13, 1990

[54] NONCOHERENT-COHERENT A.C. COUPLED BASE BAND AGC RECEIVER

[75] Inventors: Bruce H. Williams, Sandy; Christopher R. Keate, Salt Lake City; Jeffrey Mac Thornock, Layton, all of Utah

[73] Assignee: Unisys Corp., Blue Bell, Pa.

[21] Appl. No.: 263,678

[22] Filed: Oct. 27, 1988

[51] Int. Cl.$^4$ ............................................. H03D 3/18
[52] U.S. Cl. ...................................... 375/81; 375/82; 329/308; 455/265
[58] Field of Search ................... 375/83, 98, 77, 81, 375/82, 97, 86, 102; 329/50, 104, 124, 136; 455/245-247, 249, 265

[56] References Cited

U.S. PATENT DOCUMENTS

| | | | |
|---|---|---|---|
| 3,828,138 | 8/1974 | Fletcher et al. | 455/265 |
| 4,085,378 | 4/1978 | Ryan et al. | 329/124 |
| 4,542,347 | 9/1985 | Verfaillie et al. | 329/124 |
| 4,546,323 | 10/1985 | Ryu | 329/124 |
| 4,574,246 | 3/1986 | Yoshida | 329/124 |
| 4,789,897 | 12/1988 | Kappeler et al. | 455/265 |

Primary Examiner—Robert L. Griffin
Assistant Examiner—Marianne Huseman
Attorney, Agent, or Firm—John B. Sowell; Robert S. Bramson; Mark T. Starr

[57] ABSTRACT

The present invention describes a phase shift key receiver or demodulator having an A.C. couple base band automatic gain control. A pair of detectors for the automatic gain control are A.C. coupled to the output of a pair of linear analog multipliers for the purpose of eliminating DC offset signals and for minimizing thermal noise at the input of the automatic gain control circuit. The outputs of the pair of detectors connected in the data detecting branch and the carrier tracking branch of the PLL are connected to a input of the summing circuit whose output is connected to the automatic gain control loop filter. The output of the filter supplies the scaling signal employed as the scaling input to the linear analog multipliers.

5 Claims, 3 Drawing Sheets

NONCOHERENT-COHERENT A.C. COUPLED BASE BAND AGC RECEIVER

BACKGROUND OF THE INVENTION

1. Field of the Invention

This invention relates to Phase Shift Key (PSK) receivers or demodulators. More particularly, the present invention relates to a new and improved receiver having its automatic gain control (AGC) circuit A.C. coupled to the base band stages of the phase lock loop (PLL) to provide an improved signal to noise ratio (SNR) data output.

2. Description of the Prior Art

Heretofore, PLL circuits for receivers and AGC circuits for PLLs were known. However, the prior art AGC circuits had their voltage control gain devices coupled to the intermediate frequency (IF) stage where the noise and interference signals, such as jamming signals are amplified before entering the PLL.

It has been suggested that the prior art detector in the data branch of the phase lock loop be placed after the low pass filter in the data branch of the phase lock loop and the detector output be coupled back to the input of the AGC loop filter. When this is done, the output of the AGC loop filter is still coupled back to the voltage control gain device in the IF stage where the noise and the interference signals are still amplified before entering the phase lock loop.

It would be extremely desirable to provide a PSK receiver that minimizes the noise amplification in the automatic gain control circuit and thus provides an improved signal to noise ratio of the data output signals during both acquisition and after lock on.

SUMMARY OF THE INVENTION

It is a principal object of the present invention to provide a novel base band A.C. coupled AGC receiver.

It is a principal object of the present invention to provide an A.C. coupled receiver which eliminates DC offset signals that occur prior to detection.

It is another principal object of the present invention to provide an A.C. coupled receiver that employs inexpensive low pass filters instead of expensive band pass filters.

It is another object of the present invention to provide an A.C. coupled receiver that enables better filtering and lower signal to noise ratio of the output data.

It is another object of the present invention to provide an A.C. coupled receiver that enables faster acquisition of the data signal by employing higher voltage error signals in the phase lock loop.

It is another principal object of the present invention to provide a novel A.C. coupled receiver that detects the data signal in a noncoherent mode and after acquisition eliminates a portion of the noise signal estimate from the tracking loop to achieve better signal to noise ratio.

According to these and other objects of the present invention there is provided an A.C. coupled receiver having a phase lock loop of the type including a data branch and a carrier tracking branch coupled to a voltage controlled oscillator. Linear analog multipliers are provided after the low pass filters in each of the phase locked loop branches. The output of the linear analog multipliers are A.C. coupled to a third analog multiplier to provide a phase error voltage signal output. The phase error voltage signal output is then coupled to the input of the VCO. The outputs of the linear analog multipliers are each further A.C. coupled to detectors whose outputs are then coupled to an automatic gain control loop filter through a summing circuit and the output of the AGC loop filter is then coupled back to the input of the linear analog multipliers which act as voltage control gain devices to provide adjustment of the signal levels in the phase lock loop and to eliminate the DC offset voltages and noise introduced in the input IF stages of the phase lock loop.

DESCRIPTION OF THE PREFERRED EMBODIMENTS

Figure 1:
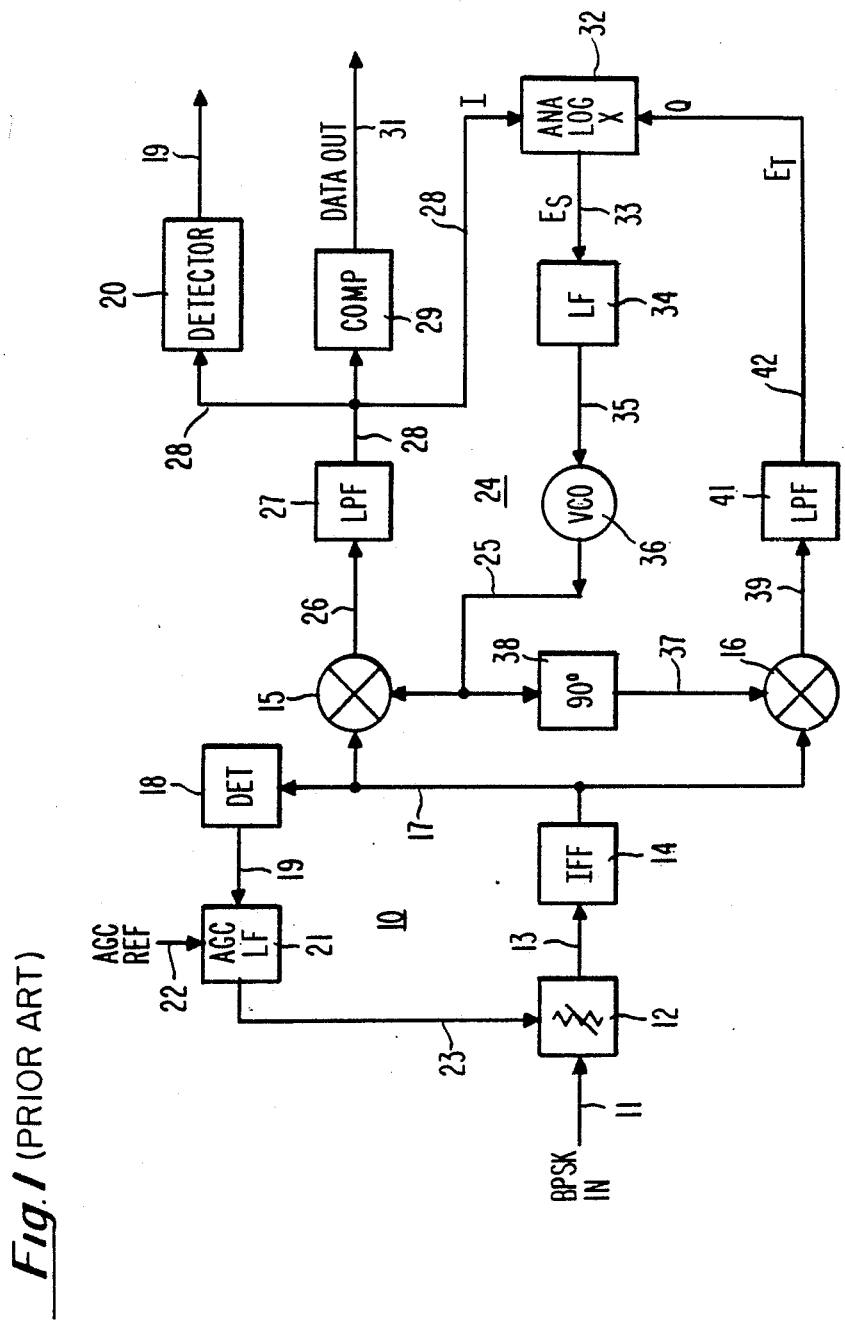
FIG. 1 is a block diagram of a prior art phase lock loop (PLL) for a BPSK receiver of the type employing an automatic gain control circuit (AGC) at the IF stage.

Refer now to FIG. 1 showing a block diagram of a prior art phase lock loop of the type employed in a BPSK receiver. A BPSK signal on line 11 is applied to a voltage control gain device 12 which may be implemented as an attenuator or a amplifier. The output of the gain device 12 on line 13 is applied to a intermediate frequency (IF) filter 14 which must have a band pass width sufficient to encompass the modulated data signal as well as any frequency uncertainties which are caused by doppler shift or drift. The output of the IF filter 14 is power divided and applied to the input of two mixers 15 and 16 via line 17. The filtered signal on line 17 is applied to a square log detector 18 which produces a DC level signal on output line 19 that is applied to the automatic gain control loop filter 21. Loop filter 21 has a reference voltage level applied via line 22 used to set the operating point of the detector 18 for the automatic gain control lop 10. The output of the loop filter 21 on line 23 is applied as the control input to the voltage control gain device 12 thus completing the automatic gain control loop.

Phase lock loop 24 comprises an upper data branch and a lower carrier tracking branch. The data branch input signal on line 17 is applied to a mixer 15 also having an input from the voltage controlled oscillator on line 25. The output of mixer 15 on line 26 is applied to a low pass filter 27 to produce a filtered output on line 28 which is applied to a comparator 29 to produce the desired data output signal on line 31. The output of the low pass filter on line 28 is also applied to a analog multiplier 32 as the I or inphase input to produce a phase error signal on output line 33 which is applied to the loop filter 34. The output of the loop filter 34 on line 35 is a DC voltage error signal which is applied to the voltage controlled oscillator 36 to produce a frequency on line 25 which is either inphase or 180 degrees out of phase with the input signal on line 17. The data output on line 31 may be inphase with the signal on line 17 or may be 180 out of phase with the input signal which must be determined at a later stage of the receiver (not shown). The input data modulated signal on line 17 is applied to mixer 16 along with a quadrature phase shifted signal on line 37 produced by phase shifting the output signal on line 25 90 in the phase shifter 38. The quadrature phase shifted signal on line 39 from mixer 16 is applied to a low pass filter 41 to produce a data modulated phase error signal on output line 42 which is applied to the analog multiplier 32 as a quadrature error signal to produce the phase error signal $E_s$ on line 33 which adjusts the voltage control oscillator to track the input signal on line 17.

It will be noted that the intermediate frequency filter 14 must by necessity be a wide band filter in order to pass the modulated signal with any frequency uncertainty to the input line. This signal contains the data modulated carrier and noise within the band width of filter 14. While loop filter 21 may be more narrow it averages the signal and noise levels on input line 19 and adjusts the level to a predetermined desired automatic gain control level so that the noise at the input of the phase lock loop 24 is amplified before it enters the phase lock loop.

The output of the low pass filter 27 may be applied to a detector 20 having an output line 19 as described hereinbefore. Then the detector 18 and its input line 17 may be removed from the automatic gain control circuit 10 and replaced by detector 20. In this manner the automatic gain control level is being set at the data output level rather than at the data modulated carrier input to the mixers. However, it will be noted that the aforementioned problems with amplification of noise and DC level shift are still amplified in the automatic gain control circuit 10 which restricts the allowable variation in input signal strength for the receiver.

Figure 2:
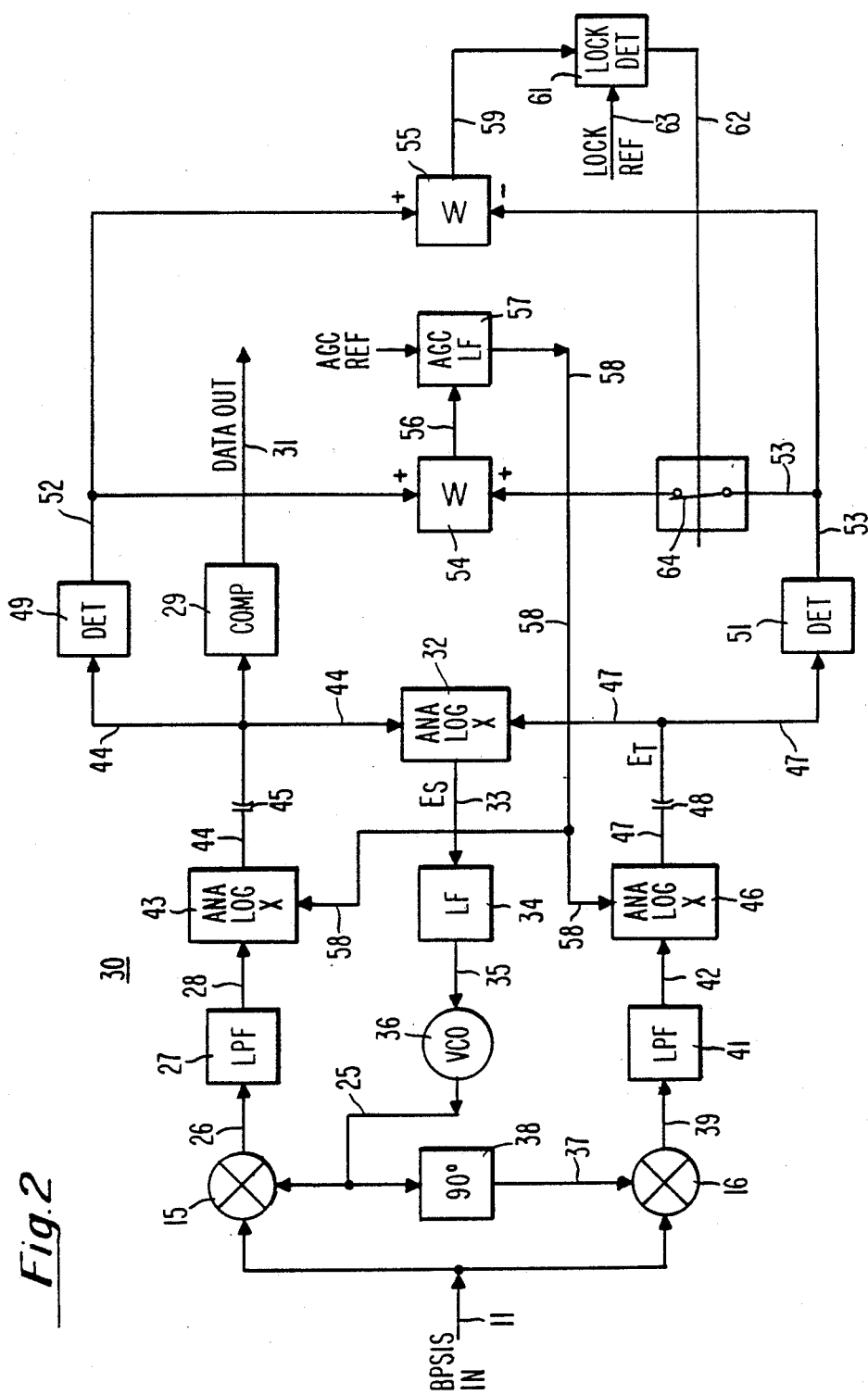
FIG. 2 is a block diagram of the preferred embodiment of the present invention binary PSK receiver showing the ACG circuit, being A.C. coupled to a base band stage of the phase lock loop.

Refer now to FIG. 2 showing a block diagram of the preferred embodiment BPSK receiver 30. The numbers employed to denote the elements of receiver 30 that are the same and operate in the same manner as those employed in FIG. 1 are numbered the same and do not require additional explanation herein.

The BPSK data modulated signal on line 11 is applied to the inputs of mixers 15 and 16 and down converted by the voltage controlled oscillator signal on line 25 to produce a base band data signal on line 26. The base band data signal on line 26 is applied to low pass filter 27 to produce a filtered data signal on line 28 which is applied to a linear analog multiplier 43. The output of multiplier 43 on line 44 is AC coupled to the analog multiplier 32 to produce the aforementioned phase error signal on line 33 that is applied to the loop filter 34. The output of the loop filter 34 on line 35 is applied to the voltage controlled oscillator 36 which produces the voltage control frequency signal on line 25 which tracks the carrier signal appearing at the input of the receiver 30 on line 11.

The data modulated carrier signal on line 11 is applied to mixer 16 with a quadrature phase shifted voltage control output signal on line 37 as described hereinbefore to produce a base band signal on line 39 which is shifted inphase 90° from the data signal on line 26. The quadrature phase shifted signal on line 39 is applied to low pass filter 41 to produce a data modulated phase error signal on line 42. The signal on line 42 is applied to a linear analog multiplier 46 to produce an AC coupled phase error tracking signal on line 47 which is applied to the input of analog multiplier 32. It will be noted that the outputs of analog multipliers 43 and 46 are A.C. coupled to the analog multiplier 32 by means of capacitors 45 and 48.

The A.C. coupled signal at the output of analog multiplier 43 on line 44 is applied to a base band detector 49 to produce a DC output level signal. Similarly, a second base band detector 51 has its input A.C. coupled to the output of linear analog multiplier 46 to produce a DC level at its output proportional to the signal and noise on line 47 of the carrier tracking branch. The DC output signals at the output of detectors 49 and 51 on lines 52 and 53 are applied to a first summing circuit 54 and to a second summing circuit 55. The output of summing circuit 54 on line 56 is applied to the automatic gain control loop filter 57 to produce a DC scaling voltage on line 58 which is applied to the inputs of the linear analog multipliers 43 and 46 to complete the automatic gain control loop having two branches. Comparator 29 is A.C. coupled to the output of linear analog multiplier 43 in the data branch of the phase lock loop to produce data signals on output line 31. It will be noted that the DC offsets which occur in devices 15 and 43 are blocked by A.C. coupling capacitor means 45 from entering detector 49. Further, low pass filter 27 may have a smaller equivalent noise band width than at the intermediate frequency levels at filter 14 as employed in the prior art. Accordingly, the amount of noise which appears at the input of detectors 49 and 51 is minimized.

In order to further minimize the noise in receiver 30 the outputs of detectors 49 and 51 on lines 52 and 53 are applied to the aforementioned summing circuit 55 to produce a difference voltage signal on line 59 which is applied to lock detector 61 to produce a output actuation signal on line 62 when the output level on line 59 exceeds the lock reference level on line 63. The actuation signal on line 62 is employed to open the switch 64 in the branch line 53 connected to summing circuit 54. The signal at the output of detector 51 on line 53 contains no data component but does contain some noise from the detector 51 and the tracking branch of the phase lock loop. By disconnecting line 53 from summing circuit 54 the noise which occurs after non-coherent acquisition phase lock has been achieved is eliminated from the automatic gain control filter. Coherent detection further enhances the data signal to noise ratio in the AGC loop and the phase lock loop.

It will be noted that there are three analog multipliers 43, 46 and 32 employed in the FIG. 2 preferred embodiment. The two linear analog multipliers 43 and 46 are similar to linear analog multipliers used in the prior art. However, the analog multiplier 32 as well as the detectors 49 and 51 in the preferred embodiment shown in FIG. 2 may be implemented by employing high speed analog multipliers and absolute value detectors of the type shown in our copending U.S. application Ser. No. 07/138,184 filed Dec. 28, 1987 for "A HIGH SPEED ANALOG MULTIPLIER—ABSOLUTE VALUE DETECTOR". These devices were designed for high speed operation but may be used at low speeds are cheaper and more accurate than prior art devices.

Figure 3:
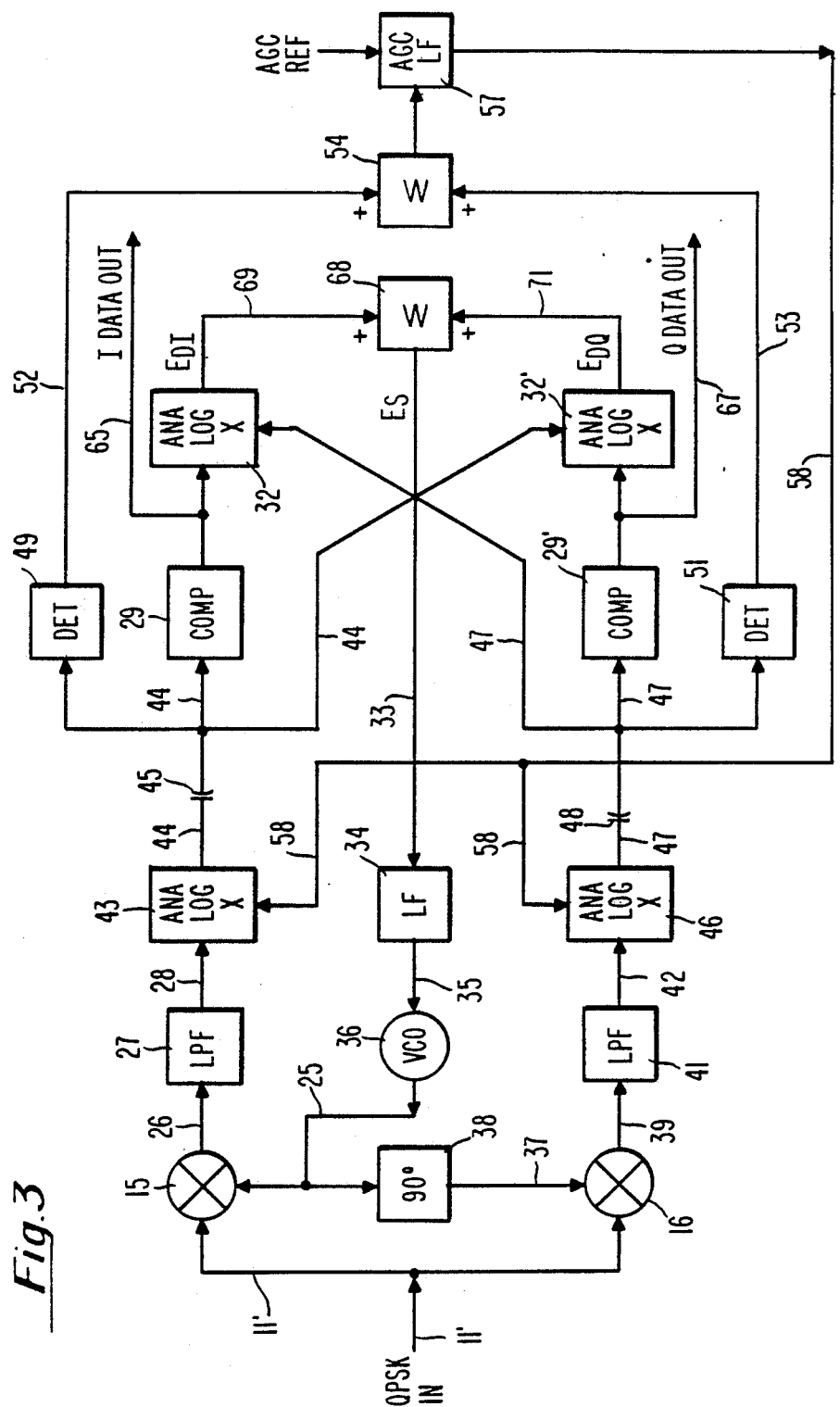
FIG. 3 is a block diagram of the present invention modified to accept quadrature phase shift key (QPSK) inputs signals.

Refer now to FIG. 3 showing a block diagram which is a modification of the FIG. 2 preferred embodiment for implementing a QPSK receiver. The receiver 40 employs components and elements identical to those used in FIG. 2 and are numbered the same in FIG. 3 and do not require additional detailed description. The quadrature phase shift keyed signal on line 11' is applied to the mixers 15 and 16 as described hereinbefore with reference to FIG. 2 but since data is appearing on the upper data branch as well as in the lower former tracking branch it is necessary to detect both branches at detectors 49 and 51 and sum them together in the summing circuit 54 to develop a DC voltage level signal that is used to estimate the power of the data in the two branches. This summed voltage signal on line 56 is applied to the automatic gain control loop filter 57 to produce an AGC scaling voltage signal on line 58 which is applied to the inputs of the linear analog multipliers 43 and 46 to complete the automatic gain control loop. In order to recover the data in the two branches of the loop, comparators 29 and 29' are A.C. coupled Via capacitors 45 and 48 to the output of the linear analog multipliers 43 and 46 on lines 44 and 47 to produce the inphase data signal on line 65 and the quadrature phase data signal on line 67. The inphase and quadrature data signals are applied to analog multipliers 32 and 32' of the type described hereinbefore with reference to FIG. 2. The inphase and quadrature branch signals on line 65 and 67 are cross multiplied with the data signals in the opposite data channels and summed together in a summing circuit 68 to produce a phase error signal $E_s$ on line 33 which is applied to the loop filter 34 of the phase lock loop circuit. It will be noted that the signal at the output of analog multiplier 32 is a voltage data error signal on line 69 and a quadrature voltage error signal on line 71 instead of the phase error tracking signal explained hereinbefore.

Having explained a prior art receiver 24 having an automatic gain control loop 10 which employed a voltage control gain device 12 it will be noted that the gain device 12 is a much more complex and expensive device than the gain control devices 43 and 46 which may be linear analog multipliers. One of the reasons for this cost difference is that the gain device 12 is always in the high frequency line 11 whereas the linear analog multipliers 43 and 46 employed in FIGS. 2 and 3 are at base band frequencies. Further, the high speed analog multipliers disclosed in our copending application Ser. No. 138,184 may further reduce the cost of the receivers 30 and 40 shown in FIGS. 2 and 3 when the analog multipliers 32 and detectors 49 and 51 are made from economical switching devices as distinguished from the prior art detectors and multipliers of the type which employ diodes and which themselves create distortion, voltage displacement and temperature variation effects.

What is claimed is:

1. An A.C. coupled base band AGC receiver for receiving phase shifted key(PSK) data signals, said receiver being of the type having a phase lock loop (PLL), comprising:
    said phase lock loop having a data detection branch and a carrier tracking branch coupled to a voltage controlled oscillator (VCO),
    first and second linear analog multipliers connected respectively in one of said branches of said PLL,
    third analog multiplier means coupled to said PLL branches,
    first and second means for A.C. coupling said third analog multiplier means to said first and second linear analog multipliers,
    first and second detector means coupled to the output of said first and second means for A.C. coupling,
    summing means coupled to the output of said first and second detector means,
    an automatic gain control loop filter coupled to the output of said summing means, and
    the output of said automatic gain control loop filter being coupled as an input to said first and second linear analog multipliers to provide voltage control gain devices in each of said branches of said phase lock loop.

2. An A.C. couple receiver as set forth in claim 1 wherein said linear analog multipliers are connected in the base band stages of said data detection branch and said carrier tracking branch.

3. An A.C. coupled receiver as set forth in claim 2 wherein said carrier tracking branch is employed as a quadrature phase shifted data branch for receiving QPSK signals.

4. An A.C. couple receiver as set forth in claim 1 wherein said first and second detector means comprises a pair of detectors each having their outputs connected to said summing means,
    means for determining when a non-coherent acquisition of said PSK signal has occurred, and
    means for disconnecting the output of one of said detectors from said summing means when acquisition of the SK input signal has occurred.

5. An A.C. couple receiver as set forth in claim 4 wherein said means for determining when coherent acquisition has occurred comprises a lock detector, and
    said means for disconnecting one of said detectors comprises a switch coupled in the output of the detector in said carrier tracking branch.

* * * * *